(12) United States Patent
Luger et al.

(10) Patent No.: US 10,461,664 B1
(45) Date of Patent: Oct. 29, 2019

(54) INVERTER AND METHOD FOR OPERATING AN INVERTER

(71) Applicant: Fronius International GmbH, Pettenbach (AT)

(72) Inventors: Andreas Luger, Weisskirchen an der Traun (AT); Gerhard Reiter, Laakirchen (AT); Bernhard Doppelbauer, Krenglbach (AT); Bernhard Staudinger, Steinbach an der Steyr (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 16/305,963

(22) PCT Filed: Jun. 2, 2017

(86) PCT No.: PCT/EP2017/063475
§ 371 (c)(1),
(2) Date: Nov. 30, 2018

(87) PCT Pub. No.: WO2017/207764
PCT Pub. Date: Dec. 7, 2017

(30) Foreign Application Priority Data

Jun. 3, 2016 (EP) .................................... 16172884

(51) Int. Cl.
*H02M 7/5387* (2007.01)
*H02J 3/38* (2006.01)
(Continued)

(52) U.S. Cl.
CPC ........... *H02M 7/5387* (2013.01); *H02J 3/383* (2013.01); *H02J 9/062* (2013.01); *H02M 1/32* (2013.01);
(Continued)

(58) Field of Classification Search
CPC ...... H02M 7/5387; H02M 1/32; H02M 7/487; H02M 2001/325; H02J 3/383; H02J 9/062
See application file for complete search history.

(56) References Cited

U.S. PATENT DOCUMENTS 4,871,421 A   10/1989  Ogle et al.
7,515,446 B2 *  4/2009  Lin .................. H02M 7/53871
                                                315/307
(Continued)

FOREIGN PATENT DOCUMENTS

DE   10 2014 104 216 B3   6/2015
JP   H09-65657 A          3/1997
(Continued)

OTHER PUBLICATIONS

International Search Report of PCT/EP2017/063475, dated Jul. 18, 2017.
(Continued)

*Primary Examiner* — Adolf D Berhane
(74) *Attorney, Agent, or Firm* — Collard & Roe, P.C.

(57) ABSTRACT

The invention relates to an inverter (1) for converting a direct voltage ($U_{DC}$) into an alternating voltage ($U_{AC}$) for feeding into a single-phase three-conductor network (3) and for supplying loads (4), comprising a DC input (5), an intermediate circuit (6) having an intermediate circuit center point (7), a DC/AC converter (8) having at least two half bridges (12, 13), a control device (9), and an AC output (10) for connecting to the single-phase three-conductor network (3) and the loads (4'). The invention further relates to a method for operating such an inverter (1). According to the invention, the control device (9) is designed to connect, in an emergency power operation (BOM), one half bridge (12) of the DC/AC converter (8) to a phase conductor (L1) of the AC output (10), to connect the other half bridge (13) of the
(Continued)

DC/AC converter (8) to another phase conductor (L2) of the AC output (10), and to connect the intermediate circuit center point (7) to the neutral conductor (N) of the AC output (10) and to halve the amplitude of the output signal (U1$_{BOM}$, U2$_{BOM}$) of the half bridges (12, 13), and to perform a phase shift of the output signal (U1$_{BOM}$ or U2$_{BOM}$) of one half bridge (12 or 13) by 180° such that at least some loads (4) can also be supplied in emergency power operation (BOM).

10 Claims, 7 Drawing Sheets

(51) Int. Cl.
    *H02J 9/06*      (2006.01)
    *H02M 7/487*     (2007.01)
    *H02M 1/32*      (2007.01)

(52) U.S. Cl.
    CPC ...... *H02M 7/487* (2013.01); *H02M 2001/325* (2013.01)

(56) References Cited

U.S. PATENT DOCUMENTS 9,369,062 B2   6/2016  Wachenfeld et al.

| | | | |
|---|---|---|---|
| 2014/0119083 A1* | 5/2014 | Falk | H02J 3/383 363/123 |
| 2014/0159504 A1* | 6/2014 | Vogt | H02J 3/383 307/109 |
| 2015/0295491 A1* | 10/2015 | Lenz | H02J 3/383 323/234 |
| 2016/0134102 A1* | 5/2016 | Bieniek | H02S 50/00 363/55 |
| 2018/0131291 A1* | 5/2018 | Lavieville | H02M 7/483 |
| 2018/0267094 A1* | 9/2018 | Moertl | B60L 58/10 |
| 2019/0207534 A1* | 7/2019 | Mueller | H02J 3/383 |
| 2019/0238088 A1* | 8/2019 | Zhuang | H02M 7/49 |

FOREIGN PATENT DOCUMENTS

| | | |
|---|---|---|
| JP | H09-74771 A | 3/1997 |
| JP | 2000-102265 A | 4/2000 |
| JP | 2014-072941 A | 4/2014 |

OTHER PUBLICATIONS

European Search Report in EP 16172884.5-1809, dated Dec. 9, 2016, with English translation of relevant parts.

\* cited by examiner

INVERTER AND METHOD FOR OPERATING AN INVERTER

CROSS REFERENCE TO RELATED APPLICATIONS

This application is the National Stage of PCT/EP2017/063475 filed on Jun. 2, 2017, which claims priority under 35 U.S.C. § 119 of European Application No. 16172884.5 filed on Jun. 3, 2016, the disclosure of which is incorporated by reference. The international application under PCT article 21(2) was not published in English.

The invention relates to an inverter for converting a direct voltage of a direct voltage source into an alternating voltage for feeding into a single-phase three-conductor network and for supplying loads, comprising a DC input for connecting to the direct voltage source, an intermediate circuit having an intermediate circuit center point, a DC/AC converter, a control device, and an AC output having two or more phase conductors and a neutral conductor for connecting to the single-phase three-conductor network and to the loads, wherein the DC/AC converter has at least two half bridges which, in a normal operation, are connected in parallel on the output side and are connected to one of the phase conductors of the AC output, and wherein the intermediate circuit center point is connected to one of the other phase conductors of the AC output.

The invention further relates to a method for operating an inverter for converting a direct voltage of a direct voltage source into an alternating voltage for feeding into a single-phase three-conductor network and for supplying loads, comprising a DC input for connecting to the direct voltage source, an intermediate circuit having an intermediate circuit center point, a DC/AC converter, a control device, and an AC output having two or more phase conductors and a neutral conductor for connecting to the single-phase three-conductor network and to the loads, wherein the DC/AC converter has at least two half bridges which, in a normal operation, will be connected in parallel on the output side and will be connected to one of the phase conductors of the AC output, and wherein the intermediate circuit center point will be connected to one of the other phase conductors of the AC output.

Inverters are used to convert the direct voltage of an energy source, for example of photovoltaic modules, into a sinusoidal alternating voltage which can be fed into a utility grid or supply network or can also be used directly for supplying loads with energy. In order to be capable to feed in a power as high as possible with a current as low as possible, usually an inverter is connected to the phase conductors or phases of the utility grid. In particular in single-phase three-conductor networks or split-phase three-wire systems which are also called split-phase systems in North America and which comprise three conductors (two phase conductors and the neutral conductor), in case of a grid or network failure the problem arises with regard to the supply of energy to the loads that, due to the inverter which is connected to the phase conductors, a transformer with center tapping at the secondary side or at least an auto-transformer has to be used, as a majority of the loads is connected between one of the phase conductors and the neutral conductor. Such a transformer is relatively expensive, which is why it is searched for possibilities where no such transformer has to be used.

The present invention is particularly intended for utility grids in the form of single-phase three-conductor networks and can also be applied in single-phase three-conductor networks with three-phase expansion, which are called Delta 4-Wire, High Leg Delta or Red-Leg Delta System in North America.

One possible solution without any transformer would be the parallel use of two or more inverters for one phase conductor of the utility grid, respectively. Such a solution is generally not feasible due to the high expenditure and the high costs.

From prior art according to DE 10 2014 104 216 B3 there is known an inverter which guarantees the supply of energy to selected loads in case of an emergency power operation. In this connection, however, during the emergency power operation only single-phase loads which are arranged between one phase conductor and the neutral conductor can be supplied with energy, but not those loads which are arranged between two phase conductors of the network or grid.

The object of the present invention is to provide an inverter as mentioned above and a method for operating such an inverter, by which also in case of a failure of the utility grid (single-phase three-conductor network) an energy supply of at least some loads can be guaranteed without having to use a transformer. The disadvantages of such known devices and methods using a transformer are to be avoided or at least to be reduced.

The object according to the invention is achieved by an inverter as mentioned above, in which the control device is designed to connect, in an emergency power operation, one half bridge of the DC/AC converter to a phaseconductor of the AC output, to connect the other half bridge of the DC/AC converter to another phase conductor of the AC output, and to connect the intermediate circuit center point to the neutral conductor of the AC output, and to halve the amplitude of the output signal of the half bridges, and to perform a phase shift of the output signal of one half bridge by 180° such that at least some loads which are connected between the neutral conductor and a phase conductor can be supplied with energy also in emergency power operation. Thus, in normal operation, the inventive inverter comprising the specially interconnected half bridges of the DC/AC converter guarantees by means of the two half bridges connected in parallel on the output side the feed-in of the energy into the phase conductors of the single-phase three-conductor network, while in emergency power operation the half bridges are switched over correspondingly and the amplitude of the output signal of the half bridges is halved in order to guarantee at least a supply with energy of least some loads which are connected between the neutral conductor and the phase conductors also in case of a failure of the single-phase three-conductor network. Hence, in the emergency power operation, the two half bridges of the DC/AC converter each feed in between one phase conductor and the neutral conductor, respectively, and the amplitude of the output signal of the half bridges is halved compared to that of the output signal during normal operation, so that at least those loads which, even in emergency power operation, are connected between the neutral conductor and the phase conductors at the AC output of the inverter can be supplied with energy. In contrast to prior art, no additional transformer with center tapping on the secondary side is required, but only corresponding switches for switching over the half bridges and the device for halving the output signal of the half bridges are needed. Such a circuit is characterized by a particularly small expenditure and therefore low costs. By halving the output voltage and distributing the current to the two half bridges, in emergency power operation at most half of the maximum power of normal operation can be supplied to the respective loads. Consequently, a switching between normal operation and emergency power operation is possible. The control of the switching over of the half bridges from normal operation to emergency power operation, and vice versa, as well as the halving of the output signal can ideally be carried out relatively inexpensively via corresponding microcontrollers. By the phase shift of the output signal of the second half bridge by 180°, not only loads being connected between the neutral conductor and the phase conductors can still be supplied with energy during the emergency power operation, but the required supply voltage will also be available to loads which are connected between phase conductors and phase conductors. This means, through the phase shift of the output signal of a half bridge by 180°, the differential voltage of the two half bridges amounts to twice the voltage between phase conductor and neutral conductor, which, in a single-phase three-conductor network, corresponds to the voltage between phase conductor and phase conductor, and, thus, can be used for the supply of energy to loads which are connected between phase conductors and phase conductors. This design of the inverter allows that, in emergency power operation, all loads which are at least connected to the AC output of the inverter also in emergency power operation can be supplied with energy.

Another advantageous embodiment of the inverter is obtained when the control device is designed to connect, in emergency power operation, at least two of the phase conductors of the AC output with each other. This allows the supply of loads which are connected between the neutral conductor and the phase conductors, and, at the same time, results in a uniform distribution of the output current between the half bridges. The mostly non-uniform allotment of the loads to different phase conductors, which is preset from the normal operation, can be dissolved by the connection of the phase conductors. At the same time, the connection of the phase conductors effects a parallel connection of the half bridges feeding in on different phase conductors, whereby a uniform current distribution can be achieved. The connection of the phase conductors can for instance be effected by a relay inside or outside of the inverter. Due to the uniform current distribution to the half bridges, the inverter can be loaded up to the maximum current of all the half bridges, which allows that more loads, or loads with a higher power demand, can be supplied with energy in emergency power operation.

Preferably, an AC disconnector is provided which is arranged between selected loads and the remaining loads, and the control device is designed to drive the AC disconnector such that, in emergency power operation, the AC output is connected to the selected loads, while the connection to the remaining loads and to the single-phase three-conductor network is disconnected. By such an AC disconnector, which may be integrated in the inverter or can also be arranged externally thereof, in case of the emergency power operation the single-phase three-conductor network will be disconnected from the AC output of the inverter and a selection between the loads will be made, namely into selected loads which are to be provided with electric energy also in emergency power operation, and the remaining loads which do not have to be supplied with electric energy during emergency power operation. For example, a refrigerator or an alarm system can be selected as a load which is to be supplied with energy also in case of a failure of the single-phase three-conductor network in emergency power operation, whereas individual lighting appliances or electrical appliances which are not used very often are regarded as the remaining loads which only have to be supplied with electric energy in normal operation and the functioning of which can be dispensed with during an emergency power operation.

In a simplest embodiment, a switch may be provided for manually switching over between normal operation and emergency power operation. In such a case, if the failure of the single-phase three-conductor network is recognized and detected, the user has to become active and has to switch the inverter into the emergency power operation manually by means of the mechanical switch so that at least some loads, in particular the selected loads, can be supplied with energy in emergency power operation. The use of an external control signal instead of the manual switch is also conceivable and can distinguish itself in certain network configurations.

Furthermore, a measuring device for detecting network parameters of the single-phase three-conductor network can be provided, which is connected to the control device so that the deviation of a network parameter of the single-phase three-conductor network from a preset value can be displayed on a display. Through such a detection of at least one network parameter of the utility grid or supply network, the failure of the utility grid can be correspondingly brought to the attention of the user. The one or more network parameters to be detected can, for instance, be the voltage, the frequency, or also the detection of island effects. The display can take place either optically, acoustically or mechanically, for example via corresponding vibrations. The user can then decide whether he will switch the inverter over to emergency power operation.

In this case, the control device can be designed to automatically switch to the emergency power operation in the event of a deviation of at least one network parameter of the utility grid from a preset value. For example, if the present grid or network frequency will leave a preset frequency band, this can cause the automatic switching over to the emergency power operation. The switching over can also be initiated in case of a deviation of other network parameters, such as voltage, or when island effects are detected. In this connection, also national guidelines and regulations can be considered that allow the disconnection of the inverter from the utility grid only after a certain period of time. Thus, the switching over into emergency power operation and a supply of energy to at least some loads in case of a failure of the single-phase three-conductor network can be guaranteed even without any user intervention.

For the switching of the half bridges between normal operation and emergency power operation, relays can be provided which are connected to the control device. This represents a simple and inexpensive implementation possibility. The contacts of the relays will be provided at the corresponding points between the half bridges of the DC/AC converter of the inverter and the AC output, and the actuation of the relays will be controlled via the control device. By an appropriate selection or interconnection of the relays, these can also be used for the complete disconnection of the DC/AC converter from the AC output.

The half bridges of the DC/AC converter of the inverter preferably include semiconductor switches, in particular IGBTs (insulated-gate bipolar transistors). This type of transistor is preferably used in power electronics and has a good transmission or conducting performance, a high blocking voltage, a good robustness against short circuits, and is available at relatively low costs.

The direct voltage source of the inverter can be constituted by batteries and/or photovoltaic modules. In addition to these options of a direct voltage source—which can also be combined—, as a matter of course also other sources, such as generators, for instance wind generators, the AC voltage of which is rectified come into question.

Similarly, the object according to the invention is achieved by an above-described method for operating an inverter, wherein in said method, in an emergency power operation, by the control device one half bridge of the DC/AC converter is connected to a phase conductor of the AC output and the other half bridge of the DC/AC converter is connected to another phase conductor of the AC output and the intermediate circuit center point is connected to the neutral conductor of the AC output, and the amplitude of the output signal of the half bridges is halved, and a phase shift of the output signal of one half bridge by 180° is performed, such that at least some loads are supplied with energy also in emergency power operation. With regard to the advantages that can be achieved thereby, reference is made to the above description of the inverter.

In another embodiment of the method, at least two of the phase conductors of the AC output can be connected with each other by the control device in emergency power operation. A uniform current distribution to both half bridges can thus be achieved even in emergency power operation.

According to one feature of the invention, an AC disconnector will be arranged between selected loads and the remaining loads, and the AC disconnector will be driven by the control device such that, in emergency power operation, the AC output will be connected to the selected loads, while the connection to the remaining loads and to the single-phase three-conductor network will be disconnected. In this way, in emergency power operation, the single-phase three-conductor network and the remaining loads, which do not necessarily have to be supplied with energy, can be disconnected from the inverter output. The half bridges of the DC/AC converter and possibly the AC disconnector can be manually switched by means of a switch into the emergency power operation.

Advantageously, network parameters of the single-phase three-conductor network are detected and the deviation of a network parameter of the single-phase three-conductor network from a preset value will be displayed.

When the network parameters of the single-phase three-conductor network are detected, the control device can also be caused to automatically switch into the emergency power operation if at least one network parameter of the single-phase three-conductor network deviates from the preset value.

The outputs of the half bridges and the intermediate circuit center point can be switched between normal operation and emergency power operation via relays which are connected to the control device, such that the AC output of the inverter is connected to the outputs of the half bridges and to the intermediate circuit center point according to the present operating state, namely normal operation or emergency power operation.

As already mentioned above, the direct voltage source can be constituted by batteries and/or photovoltaic modules.

The invention will now be explained in more detail by means of the accompanying drawings, in which.

Figure 1:
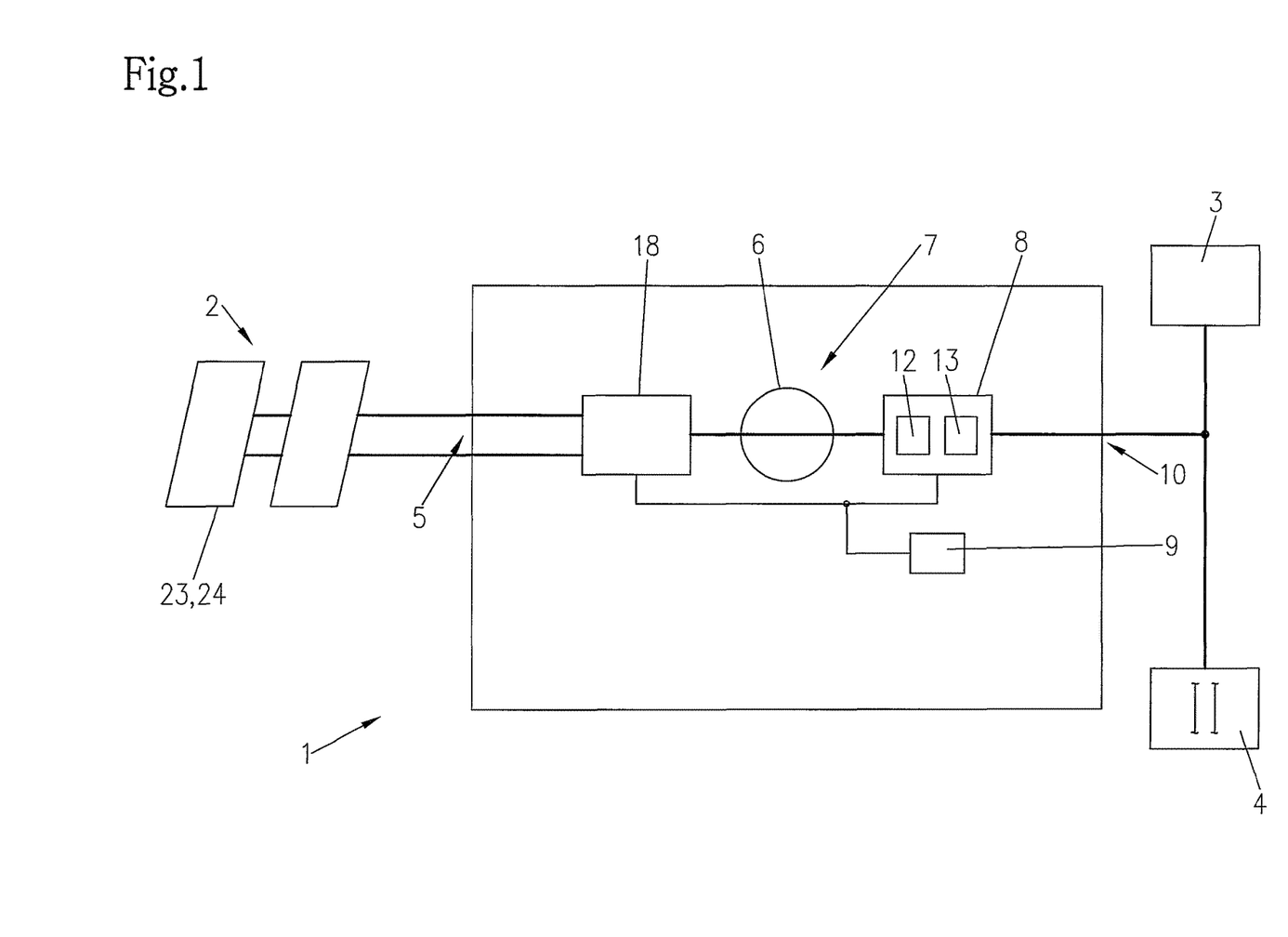
FIG. 1 shows a schematic general view of an inverter.

FIG. 1 shows a schematic general view of an inverter 1. At its DC input 5, the inverter 1 is connected to a corresponding direct voltage source 2, for instance a battery 23 or photovoltaic modules 24. Following an unspecified DC/DC converter 18, an intermediate circuit 6 with an intermediate circuit center point 7 is disposed and connected to the DC/AC converter 8. The components of the inverter 1 are controlled correspondingly via a control device 9. The output of the DC/AC converter 8 is connected to the AC output 10 of the inverter 1, which in turn is connected to the single-phase three-conductor network 3 or to the loads 4. The invention may distinguish itself particularly in cooperation with a single-phase three-conductor network or also with a single-phase three-conductor network with three-phase expansion. Certain control elements and interfaces—via which an operation of the inverter 1 or the execution of a software update of the control device 9 can be made and which are not shown—can be connected to the control device 9 of the inverter 1 which, preferably, is formed by a microprocessor, a microcontroller, or a computer.

Figure 2A:
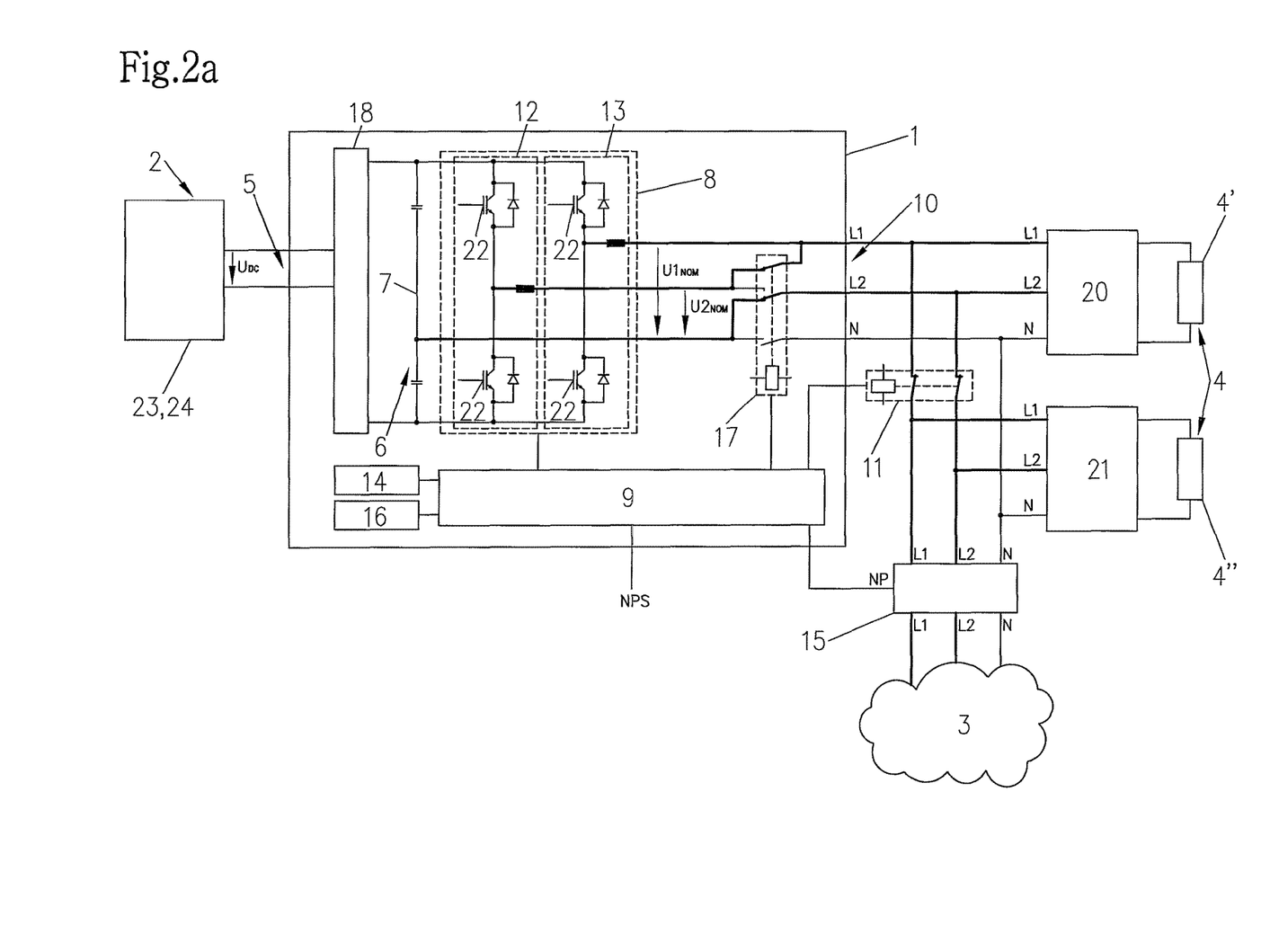
FIG. 2a shows an embodiment of the inverter according to the invention in normal operation.

In FIG. 2a there is represented an embodiment of the inverter 1 according to the invention in normal operation NOM. In the illustration there is shown the inverter 1, to the DC input 5 of which the direct voltage source 2, as for instance a battery 23 or photovoltaic modules 24, is connected. The DC/AC converter 8 of the inverter 1 includes the two half bridges 12, 13 together with the corresponding semiconductor switches 22. At the AC output 10 of the inverter 1, the single-phase three-conductor network 3 and the remaining loads 4" which, in emergency power operation BOM, do not have to be supplied with energy, are connected via an AC disconnector 11. The connection of the remaining loads 4" is usually effected by means of a main connection panel 21. Via a so-called emergency power connection panel 20, the selected loads 4", which are to be supplied with electrical energy also in emergency power operation BOM, will be connected. In the illustration, the contacts of the relay 17 for switching over the half bridges 12, 13 of the AC/DC converter are shown in normal operation NOM. Accordingly, the two half bridges 12, 13 are connected in parallel at the output, whereby the outputs of the half bridges 12, 13 are connected to the phase conductor L1 and the intermediate circuit center point 7 is connected to the phase conductor L2 of the single-phase three-conductor network 3. Thus, the feeding-in is carried out between the phase conductors L1 and L2 of the single-phase three-conductor network 3.

Figure 2B:
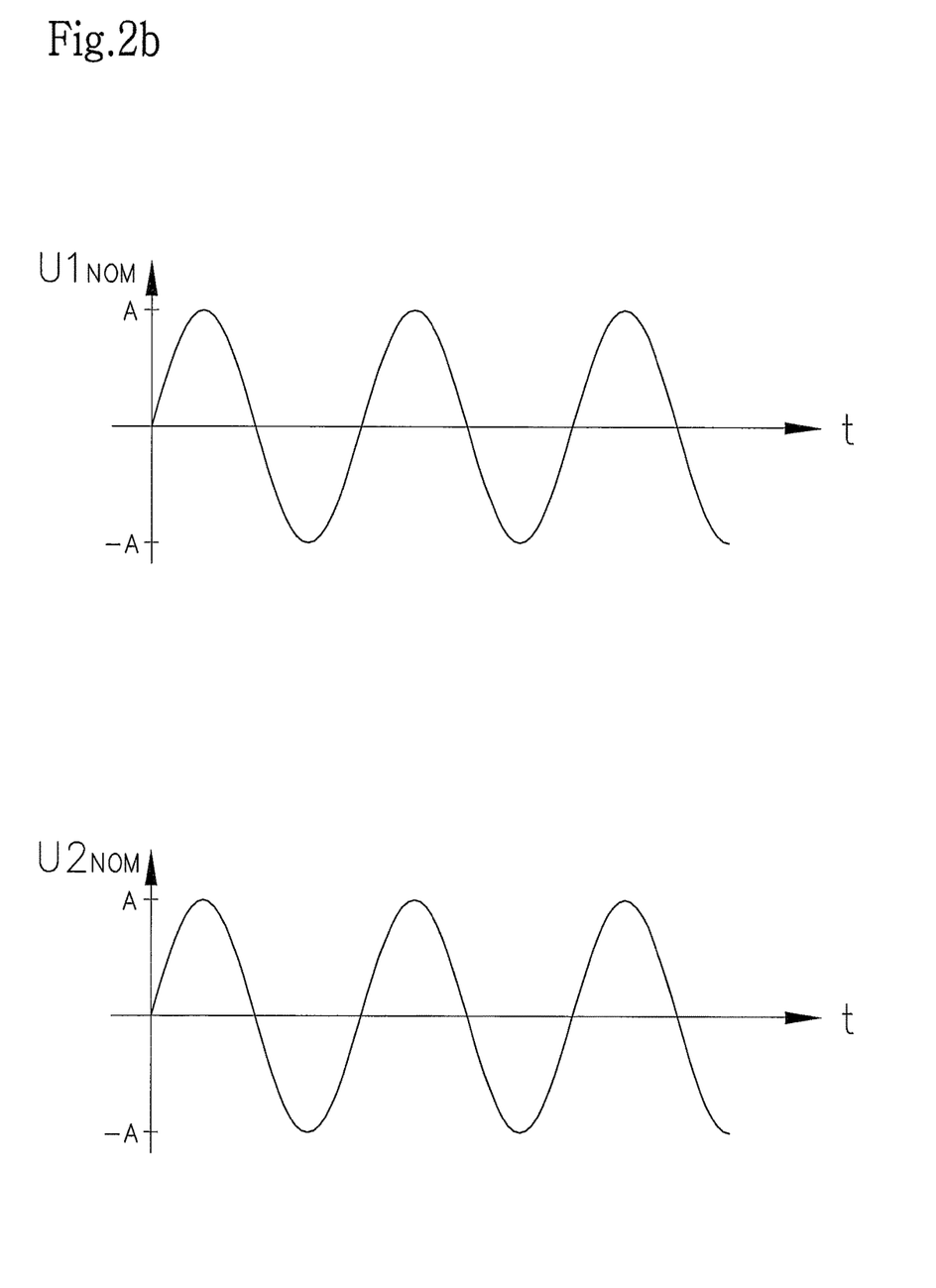
FIG. 2b shows the time curves of the output voltages of the half bridges of the DC/AC converter of the inverter in normal operation.

FIG. 2b shows the time curves of the output voltages $U1_{NOM}$, $U2_{NOM}$ of the half bridges 12, 13 of the DC/AC converter 8 of the inverter 1 in normal operation NOM. In these diagrams, the output voltage curve $U1_{NOM}$ of the first half bridge 12 of the DC/AC converter 8—which is said half bridge 12 that will be connected to the phase conductor L1 of the single-phase three-conductor network 3—is shown relative to the intermediate circuit center point 7. $U2_{NOM}$ shows the output voltage of the second half bridge 13, which is also connected to the phase conductor L1 of the single-phase three-conductor network 3. Since the intermediate circuit center point is connected to the phase conductor L2, the two voltage signals are each fed in between the phase conductor L1 and L2. Accordingly, both voltage curves have the same phase characteristic and the same amplitude A. As the feed-in power is generally limited by the current carrying capacity of the semiconductor switch 22, in normal operation NOM a higher power can be delivered by the inverter through the feeding-in between the phase conductors L1 and L2 than as compared with a feeding-in between the phase conductor L1 or L2 and the neutral conductor N.

Figure 3A:
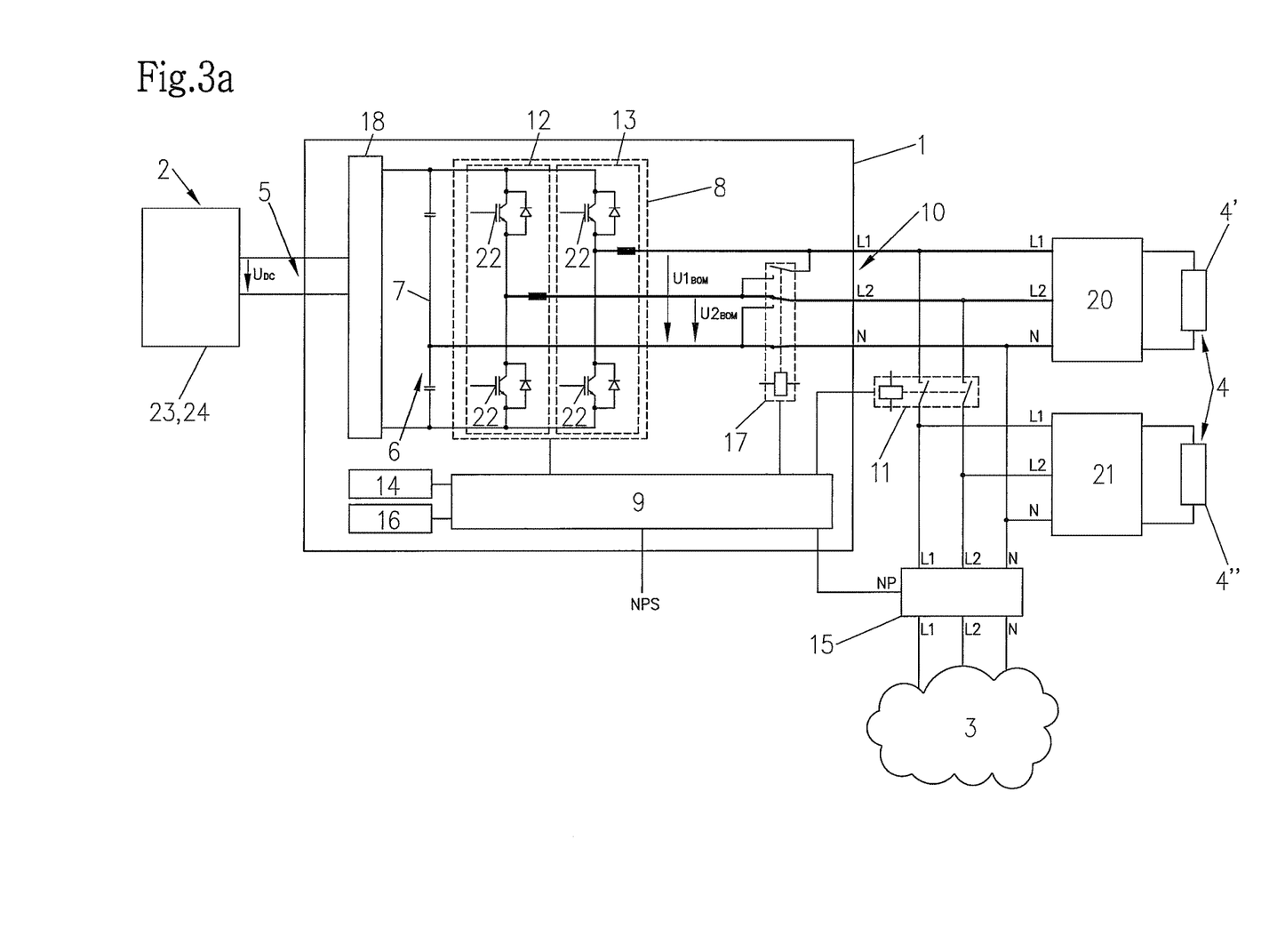
FIG. 3a shows the inventive inverter according to FIG. 2a in a first variant of the emergency power operation.

In FIG. 3a, the inverter 1 according to FIG. 2a is shown in a first variant of the emergency power operation BOM. Compared to normal operation NOM in accordance with FIG. 2a, now the AC disconnector 11 has been driven accordingly, so that the single-phase three-conductor network 3 and the main connection panel 21 are disconnected from the inverter 1, and only the selected loads 4' are connected to the AC output 10 of the inverter 1 via the emergency power connection panel 20. According to the invention, in emergency power operation BOM, the one half bridge 12 of the DC/AC converter 8 will be connected to the one phase conductor L1 of the AC output 10, the second half bridge 13 of the DC/AC converter will be connected to the other phase conductor L2 of the AC output 10, and the intermediate circuit center point 7 of the inverter will be connected to the neutral conductor N of the AC output 10. This connection of the half bridges 12, 13 to the AC output 10 which is changed compared to that in normal operation NOM is effected by the actuation of the relay 17, which represents a simple and inexpensive implementation possibility. The output signals $U1_{BOM}$, $U2_{BOM}$ of the half bridges 12, 13 are halved in amplitude compared to normal operation NOM. In addition, the output signal $U2_{BOM}$ of the second half bridge 13 is phase shifted by 180°, whereby the selected loads 4' of a single-phase three-conductor network which are connected between the phase conductors L1, L2 and the neutral conductor N and also between the phase conductor L1 and the phase conductor L2, will be supplied with energy in emergency power operation BOM.

Figure 3B:
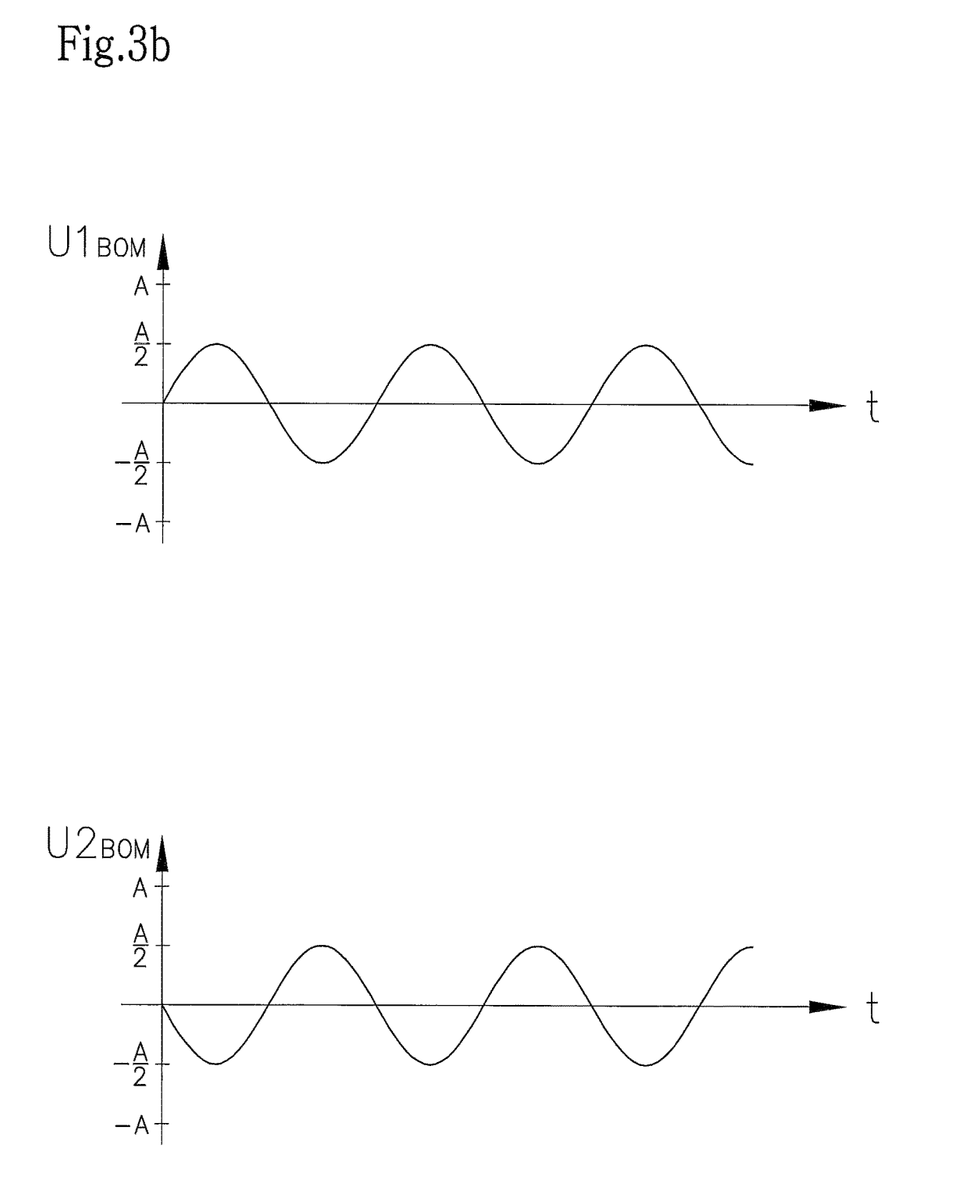
FIG. 3b shows the time curves of the output voltages of the half bridges of the DC/AC converter of the inverter in the first variant of the emergency power operation.

FIG. 3b shows the time curves of the output voltages $U1_{BOM}$, $U2_{BOM}$ of the half bridges 12, 13 of the DC/AC converter 8 of the inverter 1 in the first variant of the emergency power operation BOM. The upper diagram shows the output voltage $U1_{BOM}$ of the first half bridge 12 in dependence on the time t, which is fed in between the phase conductor L1 and the neutral conductor N which is connected to the intermediate circuit center point 7. The output signal $U2_{BOM}$ of the second half bridge 13 is phase-shifted with respect to the output signal $U1_{BOM}$ of the first half bridge 12 by 180° and is fed in between the phase conductor L2 and the neutral conductor N. The amplitude A/2 of the output signals $U1_{BOM}$, $U2_{BOM}$ is halved compared to the amplitude A of the output signals $U1_{NOM}$, $U2_{NOM}$ in normal operation NOM. Thus, in the emergency power operation BOM it is not possible to deliver the full power to the selected loads 4', but at most half of the maximum power which can be fed in normal operation.

Figure 4A:
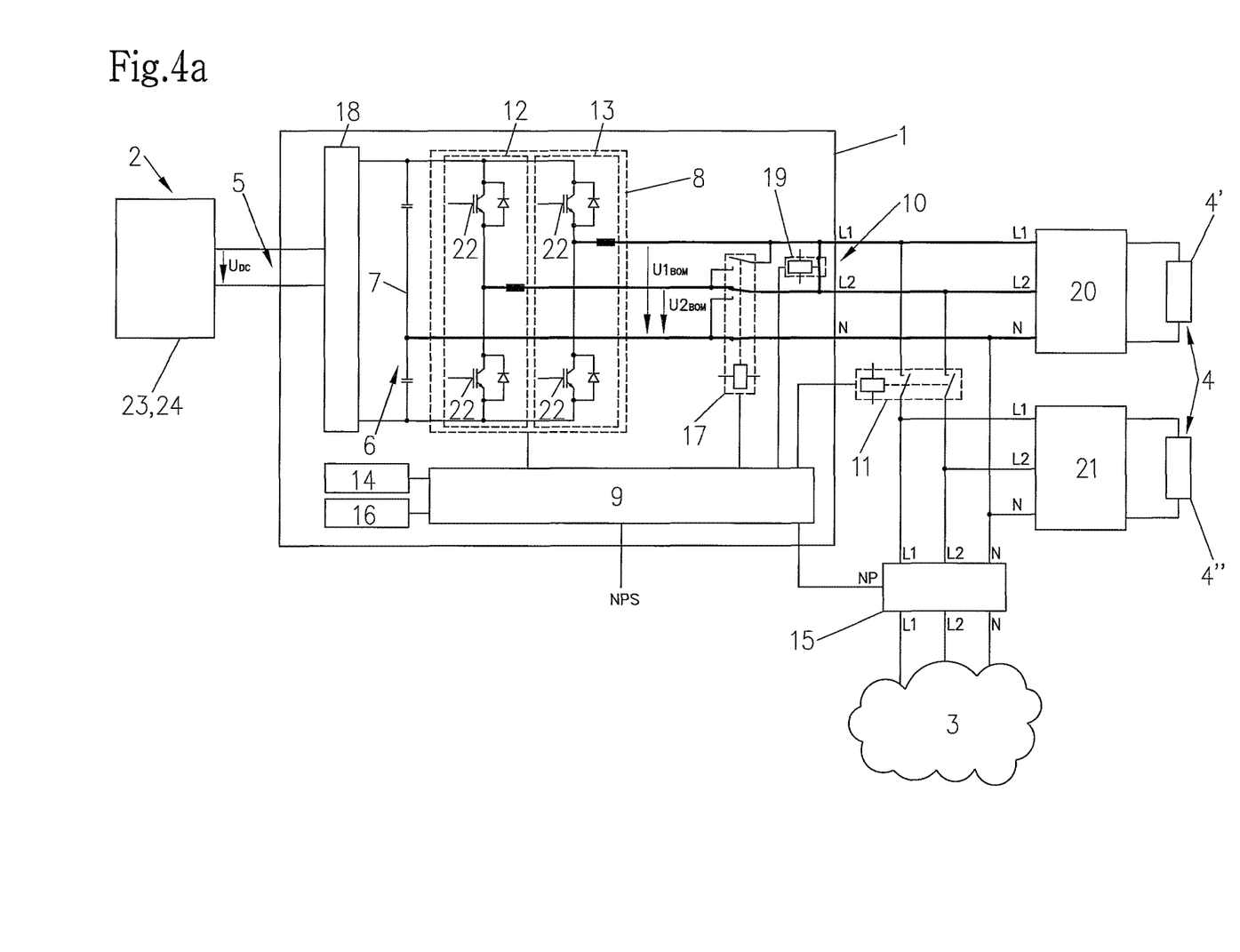
FIG. 4a shows the inventive inverter according to FIG. 2a in a second variant of the emergency power operation.

In FIG. 4a, the inverter 1 according to FIG. 2a is shown in a second variant of the emergency power operation BOM. Compared to the normal operation NOM in accordance with FIG. 2a, the AC disconnector 11 and the relay 17 are driven in a manner identical to that of the first variant of the emergency power operation BOM. Therefore, the single-phase three-conductor network 3 and the main connection panel 21 are disconnected from the inverter 1, and the selected loads 4' are connected to the AC output 10 of the inverter 1 via the emergency power connection panel 20. In contrast to the first variant of the emergency power operation BOM, here no phase shift is performed for the output signal $U2_{BOM}$ of the second half bridge 13; however, the halving of the amplitude of the output signals $U1_{BOM}$, $U2_{BOM}$ is carried out also in this variant according to FIG. 4a. In contrast to the first variant according to FIG. 3a, however, a switch is provided which is implemented as a relay 19 and which connects the two phase conductors L1, L2 with each other in emergency power operation BOM. According to FIG. 4a, said relay 19 is arranged within the inverter 1, but the connection of the phase conductors L1, L2 outside of the inverter 1 through a switch (not shown in detail) is also possible. The connection of the phase conductors L1, L2 effects a parallel connection of the half bridges 12, 13 feeding-in onto the phase conductors L1, L2, whereby a uniform current distribution is achieved. This uniform current distribution to the half bridges 12, 13 allows to load the inverter 1 up to the maximum current of all the half bridges 12, 13. Thus, a higher number of loads 4', or of loads 4' with an increased power demand, can be supplied with energy also in emergency power operation BOM.

Even if the simultaneous operation of the inverter 1 according to FIG. 3a and FIG. 4a is excluded, still both variants of the emergency power operation BOM can be implemented in one inverter. In dependence on the connected loads, then the more advantageous variant for the emergency power BOM can be selected. This can be effected manually by the user as well as also automatically, for example on the basis of the power demand.

Figure 4B:
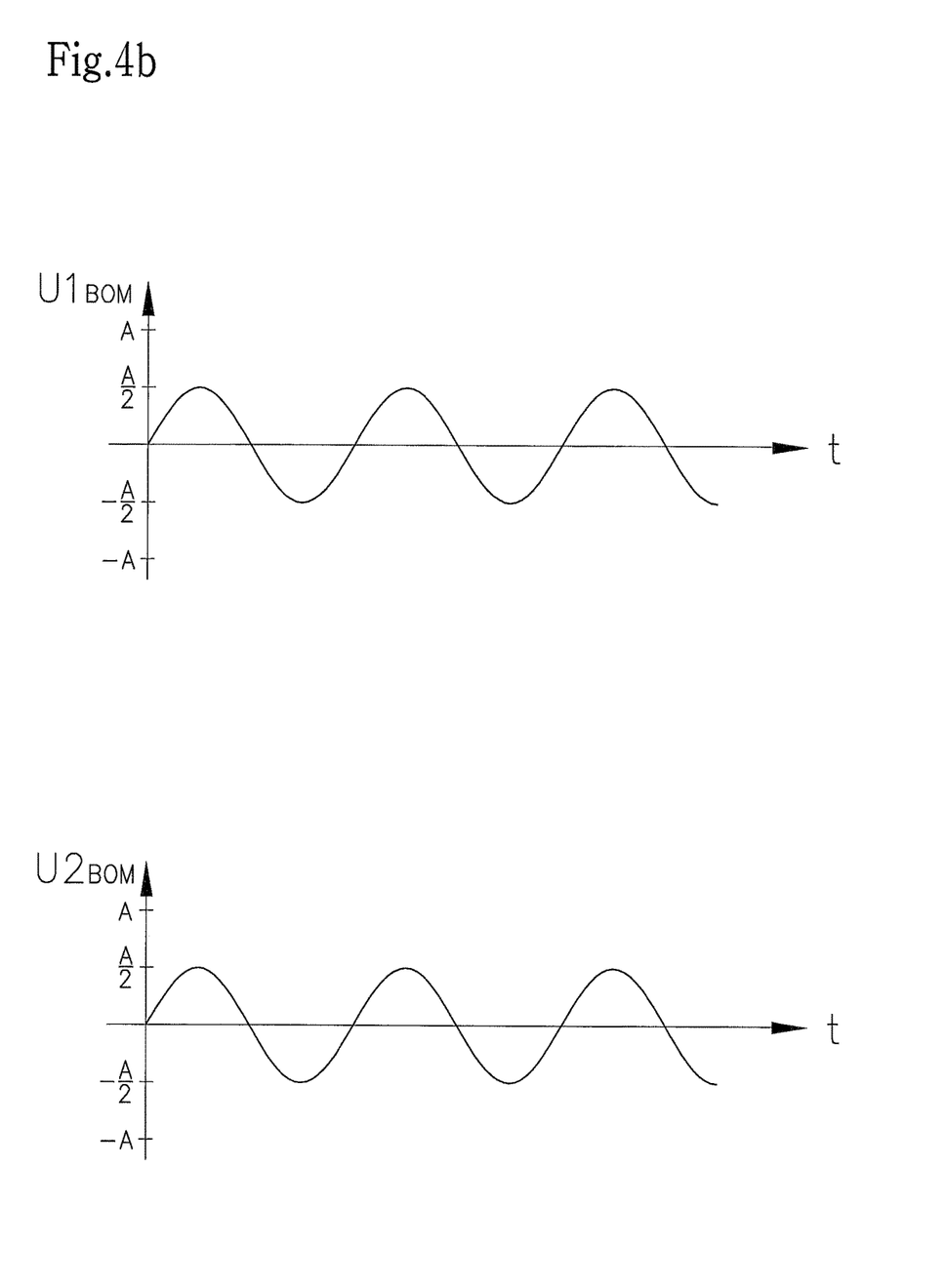
FIG. 4b shows the time curves of the output voltages of the half bridges of the DC/AC converter of the inverter in the second variant of the emergency power operation.

FIG. 4b shows the time curves of the output voltages $U1_{BOM}$, $U2_{BOM}$ of the half bridges 12, 13 of the DC/AC converter 8 of the inverter 1 in the second variant of the emergency power operation BOM according to FIG. 4a. The upper diagram shows the output voltage $U1_{BOM}$ of the first half bridge 12 in dependence on the time t, which is fed in between the phase conductor L1 or the phase conductor L2 connected thereto and the neutral conductor N which is connected to the intermediate circuit center point 7. The output signal $U2_{BOM}$ is also fed in between the phase conductor L1 and the phase conductor L2 connected thereto and the neutral conductor N, and is therefore identical to $U1_{BOM}$. The amplitudes A/2 of the output signals $U1_{BOM}$, $U2_{BOM}$ are halved compared to the amplitudes A of the output signals $U1_{NOM}$, $U2_{NOM}$ in normal operation NOM. Thus, in emergency power operation BOM it is not possible to deliver the full power to the selected loads 4', but only half of the maximum power which can be fed into in normal operation.

As becomes obvious from FIG. 2a, FIG. 3a and FIG. 4a, a switch 14 for manually switching over between normal operation NOM and emergency power operation BOM is provided. This simple design variant allows a user upon detecting the failure of the single-phase three-conductor network 3 to manually switch the inverter 1 into the emergency power operation BOM by means of the mechanical switch 14. Thus, selected loads 4' will also be further supplied with energy in emergency power operation BOM. Instead of or in parallel to the mechanical switch 14 the switching into the emergency power operation BOM can also be carried out by means of an external signal. Thus, for instance an EVU can effect the disconnection of the inverter 1 from the single-phase three-conductor network 3 in order to maintain the network or grid stability.

The measuring device 15 is provided for detecting network parameters NP of the single-phase three-conductor network 3 and is connected to the control device 9. In case of a deviation of the network parameters NP of the single-phase three-conductor network 3 by a preset value NPS, this will be displayed on the display 16. In this connection, the display 16 can take place either optically, acoustically or mechanically, for example via corresponding vibrations. Thus, the failure of the single-phase three-conductor network 3 is brought to the attention of the user, whereupon the user can switch the inverter 1 into emergency power operation BOM.

By means of the detected network parameters NP of the measuring device 15, the control device 9 can also automatically switch over to emergency power operation BOM, if at least one network parameter NP of the single-phase three-conductor network 3 deviates by the preset value NPS. In this connection, also national guidelines and regulations can be taken into consideration which allow the disconnection of the inverter 1 from the single-phase three-conductor network 3 only after a certain period of time. Thus, a switching over to the emergency power operation BOM can also be effected without any user intervention, and a supply of energy to at least some selected loads 4' is guaranteed in case of a failure of the single-phase three-conductor network 3.

The invention claimed is:

1. An inverter (1) for converting a direct voltage ($U_{DC}$) of a direct voltage source (2) into an alternating voltage ($U_{AC}$) for feeding into a single-phase three-conductor network (3) and for supplying loads (4), comprising a DC input (5) for connecting to the direct voltage source (2), an intermediate circuit (6) with an intermediate circuit center point (7), a DC/AC converter (8), a control device (9), and an AC output (10) having two or more phase conductors (L1, L2) and a neutral conductor (N) for connecting to the single-phase three-conductor network (3) and to the loads (4), wherein the DC/AC converter (8) has at least two half bridges (12, 13) which, in normal operation (NOM), are connected in parallel on the output side and are connected to one of the phase conductors (L1, L2) of the AC output (10), and the intermediate circuit center point (7) is connected to one of the other phase conductors (L1, L2) of the AC output (10), wherein the control device (9) is designed to connect, in an emergency power operation (BOM), one half bridge (12) of the DC/AC converter (8) to a phase conductor (L1) of the AC output (10), to connect the other half bridge (13) of the DC/AC converter (8) to another phase conductor (L2) of the AC output (10), and to connect the intermediate circuit center point (7) to the neutral conductor (N) of the AC output (10), to halve the amplitude of the output signal ($U1_{BOM}$, $U2_{BOM}$) of the half bridges (12, 13), and to perform a phase shift of the output signal ($U1_{BOM}$) of one half bridge (12) or of the output signal ($U2_{BOM}$) of the other half bridge (13) by 180° with respect to the output signal (U2) of the other half bridge (13) or to the BOM output signal (U1) of the one half bridge (12), such that at BOM least some loads (4) can also be supplied with energy without the use of a transformer in emergency power operation (BOM), wherein a measuring device (15) for detecting network parameters (NP) of the single-phase three-conductor network (3) is provided, which is connected to the control device (9) such that the deviation of a network parameter (NP) of the single-phase three-conductor network (3) from a preset value (NPS) is displayable on a display (16), and that the control device (9) is designed to automatically switch over to the emergency power operation (BOM) if a network parameter (NP) of the single-phase three-conductor network (3) deviates from a preset value (NPS).

2. The inverter (1) according to claim 1, wherein the control device (9) is designed to connect, in emergency power operation (BOM), at least two of the phase conductors (L1, L2) of the AC output (10) with each other.

3. The inverter (1) according to claim 1, wherein an AC disconnector (11) is provided which is arranged between selected loads (4') and the remaining loads (4"), and wherein the control device (9) is designed to drive the AC disconnector (11) such that in emergency power operation (BOM) the AC output (10) is connected to the selected loads (4'), while the connection to the remaining loads (4") and to the single-phase three-conductor network (3) is disconnected.

4. The inverter (1) according to claim 1, wherein a switch (14) for manually switching between normal operation (NOM) and emergency power operation (BOM) is provided.

5. The inverter (1) according to claim 1, wherein for the switching of the half bridges (12, 13) between normal operation (NOM) and emergency power operation (BOM) at least one relay (17) is provided, which is connected to the control device (9).

6. A method for operating an inverter (1) for converting a direct voltage ($U_{DC}$) of a direct voltage source (2) into an alternating voltage ($U_{AC}$) for feeding into a single-phase three-conductor network (3) and for supplying loads (4), comprising a DC input (5) for connecting to the direct voltage source (2), an intermediate circuit (6) with an intermediate circuit center point (7), a DC/AC converter (8), a control device (9), and an AC output (10) having two or more phase conductors (L1, L2) and a neutral conductor (N) for connecting to the single-phase three-conductor network (3) and to the loads (4), wherein the DC/AC converter (8) has at least two half bridges (12, 13) which, in normal operation (NOM), are connected in parallel on the output side and are connected to one of the phase conductors (L1, L2) of the AC output (10), and the intermediate circuit center point (7) is connected to another phase conductor (L1, L2), wherein, in an emergency power operation (BOM), by the control device (9) one half bridge (12) of the DC/AC converter (8) will be connected to a phase conductor (L1) of the AC output (10) and the other half bridge (13) of the DC/AC converter (8) will be connected to another phase conductor (L2) of the AC output (10), and the intermediate circuit center point (7) will be connected to the neutral conductor (N) of the AC output (10), the amplitude of the output signal ($U1_{BOM}$, $U2_{BOM}$) of the half bridges (12, 13) will be halved, and a phase shift of the output signal ($U1_{BOM}$) of one half bridge (12) or of the output signal ($U2_{BOM}$) of the other half bridge (13) by 180° with respect to the output signal ($U2_{BOM}$) of the other half bridge (13) or to the output signal ($U1_{BOM}$) of the one half bridge (12) will be performed, such that at least some loads (4) will also be supplied with energy without the use of a transformer in emergency power operation (BOM), wherein network parameters (NP) of the single-phase three-conductor network (3) are detected and the deviation of a network parameter (NP) of the single-phase three-conductor network (3) from a preset value (NPS) is displayed, and that, if a network parameter (NP) of the single-phase three-conductor network (3) deviates from the preset value (NPS), the control device (9) is caused to automatically switch over to the emergency power operation (BOM).

7. The method according to claim 6, wherein, in emergency power operation (BOM), at least two of the phase conductors (L1, L2) of the AC output (10) will be connected with each other by the control device (9).

8. The method according to claim 6, wherein an AC disconnector (11) is arranged between selected loads (4') and the remaining loads (4"), and wherein the AC disconnector (11) is driven by the control device (9) such that in emergency power operation (BOM) the AC output (10) will be connected to the selected loads (4'), while the connection to the remaining loads (4") and the single-phase three-conductor network (3) will be disconnected.

9. The method according to claim 6, wherein the half bridges (12, 13) of the DC/AC converter (8) and possibly the AC disconnector (11) are switched over manually by means of a switch (14) to the emergency power operation (BOM).

10. The method according to claim 6, wherein the half bridges (12, 13) are switched between normal operation (NOM) and emergency power operation (BOM) via relays (17) which are connected to the control device (9).

* * * * *

UNITED STATES PATENT AND TRADEMARK OFFICE
CERTIFICATE OF CORRECTION

PATENT NO. : 10,461,664 B1
APPLICATION NO. : 16/305963
DATED : October 29, 2019
INVENTOR(S) : Luger et al.

Page 1 of 1

It is certified that error appears in the above-identified patent and that said Letters Patent is hereby corrected as shown below:

In the Claims

In Column 9, Line 51 (Line 28 of Claim 1) please change "(U2)" to correctly read: -- $(U2_{BOM})$ --.

In Column 9, Line 52 (Line 29 of Claim 1) please delete: "BOM".

In Column 9, Line 52 (Line 29 of Claim 1) please change "(U1)" to correctly read: -- $(U1_{BOM})$ --.

In Column 9, Line 53 (Line 30 of Claim 1) please delete: "BOM".

Signed and Sealed this
Twenty-fourth Day of December, 2019

Andrei Iancu
*Director of the United States Patent and Trademark Office*